(12) United States Patent
Hinada et al.

(10) Patent No.: US 6,394,428 B2
(45) Date of Patent: May 28, 2002

(54) METHOD AND APPARATUS FOR DISSOLVING WATER-SOLUBLE GAS IN THE SEA AND ISOLATING IT DEEP IN THE SEA AND A METHOD FOR ITS INSTALLATION

(75) Inventors: Yasutoshi Hinada; Sanai Kosugi; Ken Watanabe; Kentaro Niwa, all of Osaka; Takayuki Saito, Shizuoka, all of (JP)

(73) Assignee: Sumitomo Metal Industries, Ltd., Osaka (JP)

(*) Notice: Subject to any disclaimer, the term of this patent is extended or adjusted under 35 U.S.C. 154(b) by 0 days.

(21) Appl. No.: 09/794,048

(22) Filed: Feb. 28, 2001

Related U.S. Application Data (63) Continuation of application No. PCT/JP00/04306, filed on Jun. 29, 2000.

(30) Foreign Application Priority Data

Jun. 29, 1999 (JP) ............................................. 11-184149
Jun. 29, 1999 (JP) ............................................. 11-184150

(51) Int. Cl.$^7$ .................................................. B01F 3/04
(52) U.S. Cl. .......................... 261/77; 261/120; 261/126; 261/DIG. 7
(58) Field of Search .......................... 261/77, 120, 123, 261/126, DIG. 7; 96/351, 352, 353, 354; 210/220, 242.2

(56) References Cited

U.S. PATENT DOCUMENTS

| | | | | |
|---|---|---|---|---|
| 2,717,774 A | * | 9/1955 | Obma | 261/77 |
| 3,840,216 A | * | 10/1974 | Smith et al. | 261/120 |
| 4,107,240 A | * | 8/1978 | Verner et al. | 261/120 |
| 4,278,546 A | * | 7/1981 | Roesler | 261/77 |
| 4,439,316 A | * | 3/1984 | Kozima et al. | 261/77 |
| 4,549,997 A | * | 10/1985 | Verner et al. | 261/77 |
| 5,662,837 A | * | 9/1997 | Saito et al. | 261/DIG. 7 |
| 5,779,890 A | * | 7/1998 | Bailey | 261/77 |
| 5,798,061 A | * | 8/1998 | Gaddis | 261/77 |
| 6,254,667 B1 | * | 7/2001 | Saito et al. | 261/77 |

FOREIGN PATENT DOCUMENTS

| | | |
|---|---|---|
| EP | 0 982 065 | 3/2000 |
| JP | 5-4041 | 1/1993 |
| JP | 5-306110 | 11/1993 |
| JP | 08-103649 | 4/1996 |

* cited by examiner

Primary Examiner—C. Scott Bushey
(74) Attorney, Agent, or Firm—Burns, Doane, Swecker & Mathis, L.L.P.

(57) ABSTRACT

Waste carbon dioxide gas discharged in large quantities from stationary gas generating facilities such as thermal power plants, is dissolved in sea water and isolated deep in the sea to prevent global warming. A vessel is installed in the sea or at the water surface or in the vicinity thereof. A pipe forming a short leg is open at a lower end, functions as a dissolving pipe, and is equipped with a device for blowing a water-soluble gas. A pipe forming a long leg is open at a lower end portion and functions as a sinking pipe. The pipe forming a short leg and the pipe forming a long leg are connected through the vessel, and undissolved gas is diffused into the atmosphere or into the sea from the liquid surface within the vessel.

5 Claims, 10 Drawing Sheets

METHOD AND APPARATUS FOR DISSOLVING WATER-SOLUBLE GAS IN THE SEA AND ISOLATING IT DEEP IN THE SEA AND A METHOD FOR ITS INSTALLATION

This application is a continuation of International Application No. PCT/JP00/04306, filed on Jun. 29, 2000 in Japan, which designates the United States and which was published by the Internatinal Bureau on Jan. 4, 2001, but not in the English lanaguage.

TECHNICAL FIELD

In general, this invention relates to technology for dissolving gas in a liquid. More specifically, it relates to a method and an apparats for dissolving carbon dioxide in waste gas which contains carbon dioxide gas and which is discharged in large quantities from stationary gas generating facilities such as thermal power plants in sea water and isolating it deep in the sea, and to a method of installing the apparatus.

BACKGROUND ART

From in the past, carbon dioxide has been representative of water-soluble gases which have been studied for isolation in the sea in order to prevent atmospheric pollution and global warming. Techniques for isolation in the sea of carbon dioxide gas have included (a) a method in which carbon dioxide gas is liquified and then discharged directly deep into the sea, (b) a method in which carbon dioxide gas is formed into dry ice and then dropped directly into the sea, and (c) a method in which carbon dioxide gas is blown directly into shallow seas (having a depth on the order of 200–400 meters) and dissolved.

However, in method (a), large amounts of energy and costs are necessary in order to separate and recover carbon dioxide gas from waste gas and to liquify carbon dioxide gas, and there is much acidification of sea water in the vicinity of where the liquified carbon dioxide is released, so it has the problem of large effects on the environment. In method (b), large amounts of energy and costs are necessary in order to separate and recover carbon dioxide gas from waste gas and to process it into dry ice, and after dropping dry ice directly into the sea, the state of dissolving and dispersion of carbon dioxide is unclear, so it has the problem of poor reliability of isolation in the sea. In method (c), the depth of water where carbon dioxide gas is dissolved and dispersed in the sea is shallow, so there is the problem that the period of time (the period of isolation in the sea) until the carbon dioxide which is dissolved in sea water is again released into the atmosphere is short.

A method and apparatus in which carbon dioxide gas is dissolved in sea water and is isolated by sinking sea water, which has increased in specific gravity due to dissolving carbon dioxide gas, deep into the sea is disclosed in the specification of Japanese Patent No. 2655818.

In such technology, carbon dioxide gas is blown from a pipe forming a short leg of a conduit in the shape of an inverted J having the pipe forming a short leg and a pipe forming a long leg connected at their upper portions to form an inverted J shape, sea water is made to flow in from the lower end of the pipe forming a short leg by the gas lift effect, and carbon dioxide gas is completely dissolved in the sea water by the time the sea water reaches the upper end of the pipe forming a short leg. The pipe forming a long leg of the inverted J-shaped conduit functions as a sinking pipe having its lower end opening onto deep in the sea, and sea water which has increased in density due to the dissolving of carbon dioxide sinks deep into the sea due to gravity.

If a gas is blown into water, the gas becomes bubbles and rises towards the surface of the water. At this time, the surrounding water is pulled by viscosity, The phenomena in which an upwards flow is generated is called the gas lift effect. The above-described method uses the gas lift effect to dissolve water-soluble gas in sea water and isolate it deep in the sea.

DISCLOSURE OF THE INVENTION

However, not all of the water-soluble gas which is supplied into sea water from the lower end portion of the dissolving pipe in the form of the pipe forming a short leg is dissolved in sea water, and a portion thereof remains in the pipe as undissolved gas. Furthermore, there are also cases in which insoluble gas is contained in the gas which is being blown.

In such cases, accumulation of undissolved gas takes place in the inverted J-shaped conduit, and the flow of sea water within the conduit ends up being impeded, so separation and discharge thereof must be carried out, but the separation and discharge are difficult.

If supply is carried out to the sinking pipe in a state in which undissolved gas is contained, the specific gravity of liquid in the sinking pipe decreases, and there is the problem that sinking is not carried out smoothly.

In order to supply only carbon dioxide gas, it is necessary to previously devise a separating means, so cost increases are unavoidable.

In addition, in the conventional technology disclosed in the above-described patent, the apparatus is installed in a region of the sea with a depth from the surface of at least 100 meters, and in sea water with such a depth, maintenance inspection of the apparatus is not easy, and operation must be interrupted if it is raised to above the water surface each time, so it cannot be said to be efficient.

Accordingly, a first object of this invention is to provide a method and apparatus which can easily treat undissolved gas remaining within a pipe and which can dissolve water-soluble gas in sea water and isolate it deep in the sea.

A second object of this invention is to provide a method and apparatus which can dissolve water-soluble gas in sea water and isolate it deep in the sea and which can easily carry out processing of undissolved gas remaining in a pipe even if gas such as ordinary waste gas containing a portion which is not soluble in sea water is injected without modification and which can easily undergo maintenance inspection.

A third object of this invention is to provide an installation method which can easily install such an apparatus in the sea.

The present inventors performed various investigations of means for realizing these objects and obtained the following knowledge.

(1) By placing a vessel having an appropriate space between and connecting a dissolving pipe and a sinking pipe, it is possible to separate within the vessel undissolved gas contained in the gas which is blown, and separation and discharge thereof are easy.

(2) If the above-described vessel is installed on the surface of the sea or in the vicinity thereof, not only installation but also maintenance inspection are easy.

(3) By forming the dissolving pipe, the sinking pipe, and the vessel which connects them as an integrated body, the manufacture and the installation thereof are made still easier.

Here, the present invention is a method of dissolving a water-soluble gas in sea water and isolating it deep in the sea, characterized by connecting a pipe forming a short leg and a pipe forming a long leg to a vessel which is installed in the sea or on the surface of the sea or in the vicinity thereof, with the pipe forming a short leg serving as a dissolving pipe and being maintained in shallow water in the sea, for example, blowing gas containing a water-soluble gas into its open lower end portion, introducing and raising sea water from the lower end of the pipe forming a short leg by the gas lift effect of gas in the pipe forming a short leg and dissolving water-soluble gas contained in the gas in the sea water as the sea water rises within the pipe forming a short leg, diffusing undissolved gas into the atmosphere from the liquid surface within the vessel, using the pipe forming a long leg as a sinking pipe opening onto deep in the sea, and making the sea water within the vessel sink deep into the sea due to the increase in density caused by dissolving of the water-soluble gas and due to the difference in pressure head corresponding to an increase in the liquid surface within the vessel caused by the gas lift effect.

From another standpoint, the present invention is an apparatus for dissolving water-soluble gas in sea water and isolating it deep in the sea, characterized by comprising a vessel installed in the sea or at the surface of the sea or in the vicinity thereof, a pipe forming a short leg which is connected to the vessel and which is open at its lower end portion and which is equipped with, blowing means for gas containing a water-soluble gas and which functions as a dissolving pipe, and a pipe forming a long leg which is also connected to the vessel and which is open at its lower end portion and which functions as a sinking pipe, the vessel functioning to diffuse undissolved gas to the atmosphere from the liquid surface within the vessel.

From yet another standpoint, the present invention is an apparatus for dissolving water-soluble gas in sea water and isolating it deep in the sea, characterized in that it is equipped with an elongated cylindrical structure which is installed at the surface of the sea and houses a small diameter fist vertical pipe and a large diameter second vertical pipe, the cylindrical structure and the second vertical pipe being concentrically constituted, the upper end portions of the first and second vertical pipes are connected through a container section which partitions the interior of the cylindrical structure, the first vertical pipe functions as a dissolving pipe which exhibits a gas lift effect, the second vertical pipe functions as a sinking pipe, and the vessel functions as a separator for undissolved gas, gas containing water-soluble gas is blown from a blowing nozzle mounted near the lower end of the dissolving pipe which opens into the sea and sea water flows into the lower end of the dissolving pipe due to the gas lift effect of the gas in the dissolving pipe, the water-soluble gas contained in the gas is dissolved in sea water as it rises within the dissolving pipe, undissolved gas which did not dissolve in sea water in the dissolving pipe is separated and accumulated in the vessel, the energy possessed by the flow within the dissolving pipe is conserved as potential energy in the rise of the water level and as energy stored in the form of pressure of the undissolved gas, and the sea water in the vessel in which water-soluble gas is dissolved settles to deep in the sea through the sinking pipe, the lower end of which extends further and is open to deep in the sea, due to the increase in density caused by the dissolving of water-soluble gas and the increase in the potential energy of the sea water in the vessel and the energy stored in the form of pressure of the undissolved gas.

In the lower portion of the cylindrical structure, a space for housing a ballast tank for adjusting buoyancy may be provided.

In the vessel, the separated and collected undissolved gas may be discharged to the atmosphere through a discharge pipe and a valve. In addition, it is also possible for the upper portion of the vessel to be open to the atmosphere.

In this manner, according to this invention, the following advantages are obtained.

(1) Regardless of concentration, waste gas containing water-soluble gas such as carbon dioxide can be supplied to sea water.

(2) When the gas lift pressure is inadequate, it is possible to take steps such as increasing the amount of blown gas or decreasing the length of the dissolving pipe in which gas is dissolved.

(3) The length of the dissolving pipe can be adjusted to the optimal length based on dissolving efficiency and the installation environment.

(4) The apparatus can be installed in shallower seas than in the past.

(5) When the proportion of undissolved gas contained in the blown gas is small, the undissolved gas expands as it rises and the proportion of gas bubbles within the dissolving pipe increases and the gas lift effect is decreased, and flow is impeded, but this can be prevented.

(6) By separating undissolved gas and dischanging it through a discharge pipe to the atmosphere, the effects on sea transportation, fishing, and ecosystems in the sea due to disturbance of the water surface by bubbles accompanying the discharge of undissolved gas can be mitigated.

(7) When installing the apparatus in sea water, it is necessary to provide buoyant devices, but by using the above-described vessel as a buoyant device or by integrating the vessel and a buoyant device, it is possible to decrease the overall size of the apparatus as well as to make the installation and mooring of the apparatus in the sea easier.

BEST MODE FOR CARRYING OUT THE INVENTION

According to this invention, a pipe forming a short leg and a pipe forming a long leg which were directly connected in the prior art are connected by a container, i.e., vessel between them which provides a space for separation of undissolved gas. As a result without losing the characteristics of conventional technology in which carbon dioxide gas is dissolved in the pipe forming a short leg and sinking due to gravity-induced flow of sea water takes place in the pipe forming a long leg, separation and collection of undissolved gas in the pipe forming a short leg can automatically be carried out, and if necessary, the undissolved gas can be diffused into the atmosphere. As a result, it is unnecessary to previously perform separation and recovery of carbon dioxide gas from waste gas as was performed in the past.

Such a container or vessel can be installed in the sea or at the surface of the sea or in the vicinity thereof.

The energy stored in the form of pressure due to gas lift is preserved by the rising of the position of the water surface within the vessel, so sinking of sea water in the pipe forming a long leg is promoted.

According to this invention, even when the vessel is installed in the sea, the undissolved gas which is separated and collected in the vessel is separately recovered or is discharged into the atmosphere above the water surface through a discharge pipe, so rising up of the surface of the sea due to the rise of bubbles accompanying the discharge of undissolved gas into the sea and effects on sea transportation and fishing are prevented, and effects on ecosystems within the sea caused by generation of upward currents accompanying the rise of bubbles can be prevented.

According to this invention, by making a flotation device for imparting buoyancy to the apparatus necessary for position maintenance in the sea also function as a vessel or by integrating it with the vessel, installation of the apparatus in the sea can be made easier.

When installing the vessel at the surface of the sea, it is possible to install the apparatus in shallower seas than when it is installed within the sea. In addition, complete dissolving of gas is not required, so the length of the gas lift dissolving pipe can be freely selected, and the amount of blown gas can be increased in order to increase the gas lift pressure.

According to the present invention in which a semi-submersible type is used as a vessel installed at the surface of the sea, it is possible to decrease the effect of waves when mooring the vessel.

By using a pipe forming a short leg in which the upper end side has a larger cross-sectional area than the lower end side, the situation can be prevented in which the effectiveness of gas lift is decreased and flow is impeded due to a change in the flow conditions within the dissolving pipe from slug flow to froth flow due to expansion of undissolved gas and an increase in the volume percentage thereof due to a decrease in water pressure accompanying a rise in sea water due to the gas lift effect within the dissolving pipe.

Furthermore, by installing the vessel in a location of relatively shallow water depth at the border between the continental shelf and the continental slope, the installation and mooring thereof in the sea become simple, and the sinking pipe can be installed along the continental slope.

In addition, by installing the vessel offshore in deep water, the length of the sinking pipe can be shortened, and pressure losses therein can be decreased. By decreasing pressure losses in the sinking pipe, sinking of sea water within the vessel to deep in the sea due to the gas lift effect is made easy.

EMBODIMENTS

Figure 1:
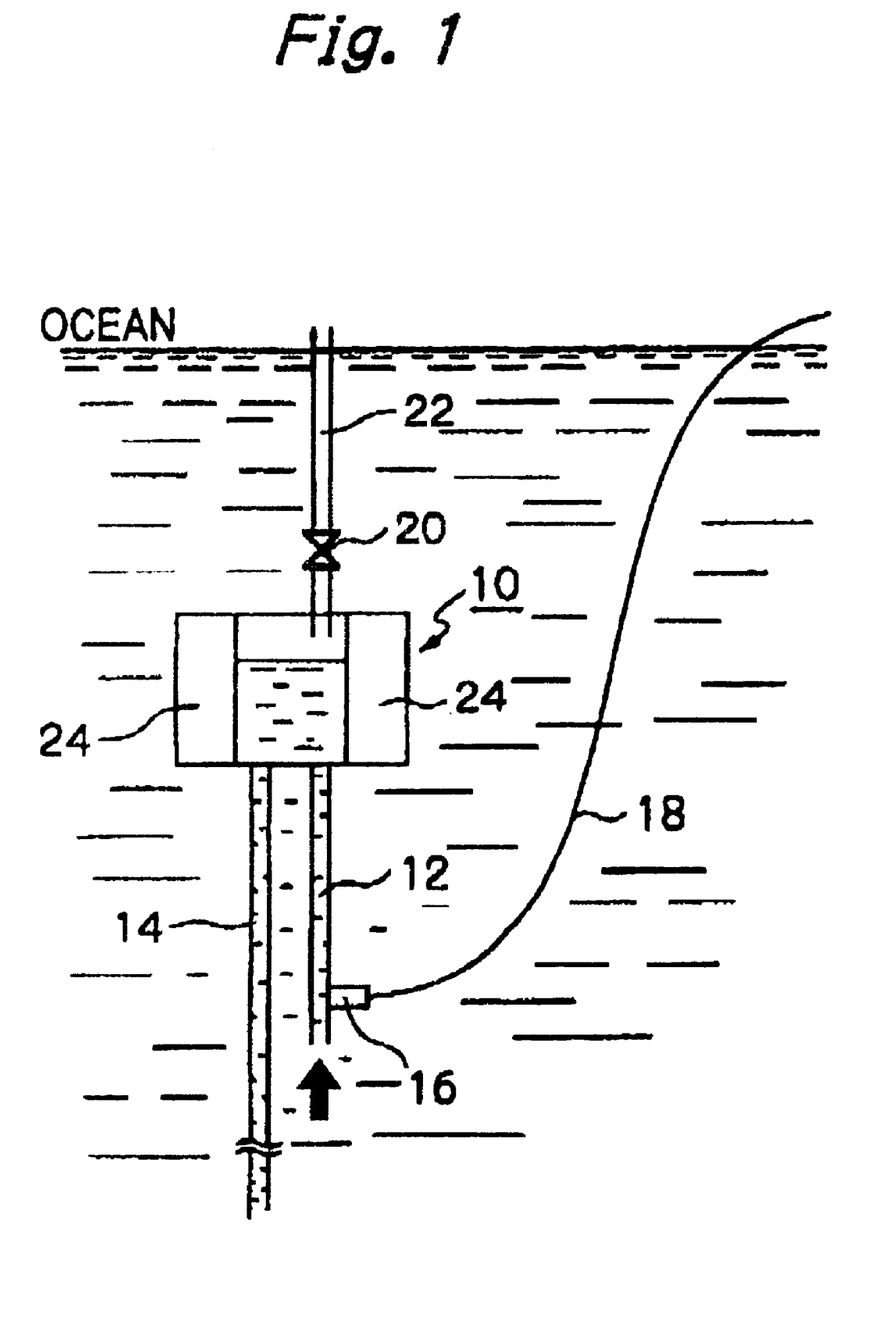
FIG. 1 is a schematic explanatory view of the structure of an apparatus according to this invention for dissolving water-soluble gas contained in waste gas in sea water and isolating it deep in the sea.

FIG. 1 shows the structure of an apparatus according to the present invention for dissolving carbon dioxide gas in sea water and isolating it deep in the sea.

The illustrated apparatus is one which dissolves water-soluble gas (carbon dioxide gas and the like) contained in waste gas discharged in large quantities from a stationary gas generating facility, such as a thermal power plant, in the sea and isolates it deep in the sea, regardless of the concentration thereof. In the figure, it is equipped with a vessel 10 and a pipe 12 forming a short leg which acts as a dissolving pipe for carbon dioxide gas and a pipe 14 forming a long leg which acts as a sinking pipe connected thereto. In the illustrated example, the vessel 10 is installed within the sea, the pipe 12 forming a short leg is equipped with a gas blowing apparatus 16, and waste gas sent from a gas supply line 18 is blown into the pipe. The pipe 14 forming a long leg is used with its lower end portion (not illustrated) opening deep in the sea.

The structure of the vessel 10 may be simply such that it is equipped with a space which is connected to the pipe forming a short leg and the pipe forming a long leg and which separates and collects undissolved gas. In the illustrated example, the vessel 10 has a structure in which it is integrated with buoyant bodies 24.

Undissolved gas which is separated within the vessel 10 is discharged into the sea through a valve 20 which is installed on the top surface of the vessel, or it is directly discharged into the atmosphere trough a discharge pipe 22. The buoyant bodies 24 for giving the vessel buoyancy necessary for maintaining its position in the-sea can be installed separately from the vessel, or they can be integrated therewith so as to also function as the vessel.

Figure 2:
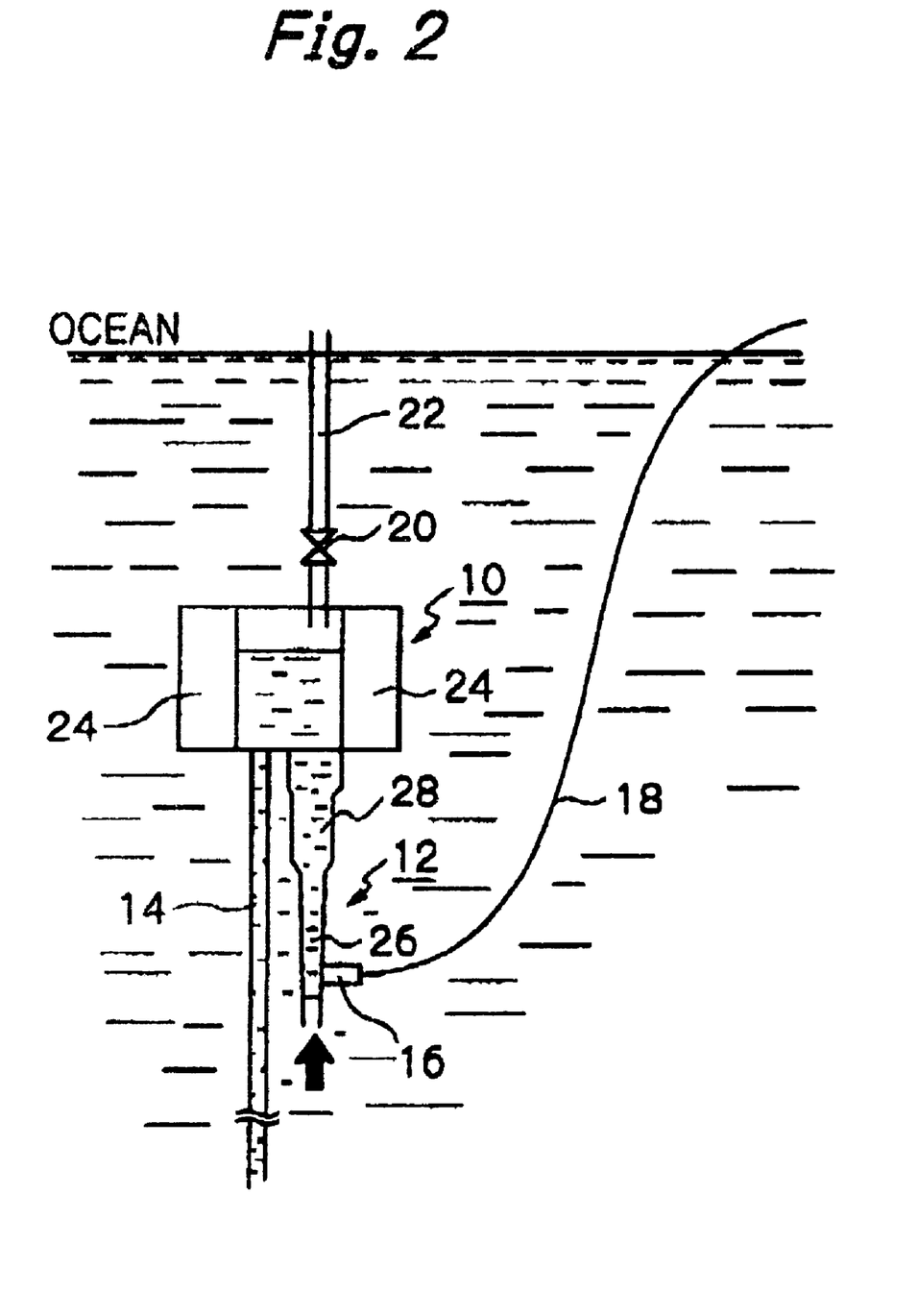
FIG. 2 is a schematic explanatory view of the same for the case in which the cross-sectional area of the upper end side of the dissolving pipe is made larger than that of the lower end side.

FIG. 2 shows an embodiment for the case in which the upper end side 28 of the pipe 12 forming a short leg which is a dissolving pipe has a larger cross-sectional area than the lower end side 26.

In the case of FIG. 2, the situation can be prevented in which the gas lift effect is decreased and flow is impeded due to a change in the flow conditions within the dissolving pipe from slug flow to froth flow due to expansion of undissolved gas and an increase in the volume percentage thereof due to a decrease in water pressure accompanying a rise in position within the dissolving pipe.

Figure 3:
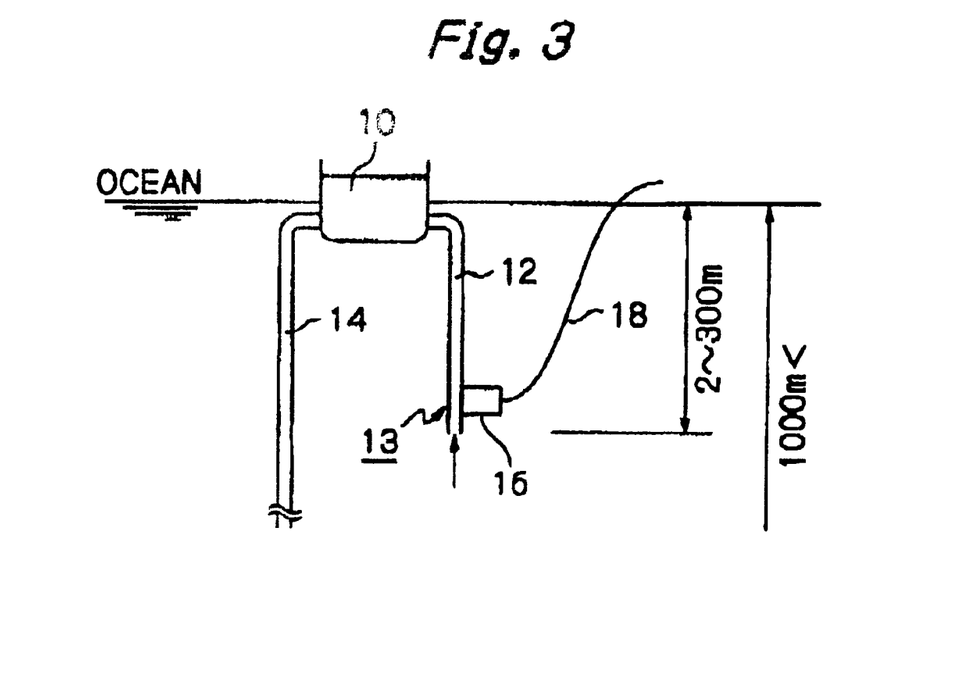
FIG. 3 is a schematic explanatory view of a different mode of an apparatus according to the present invention.
Figure 4:
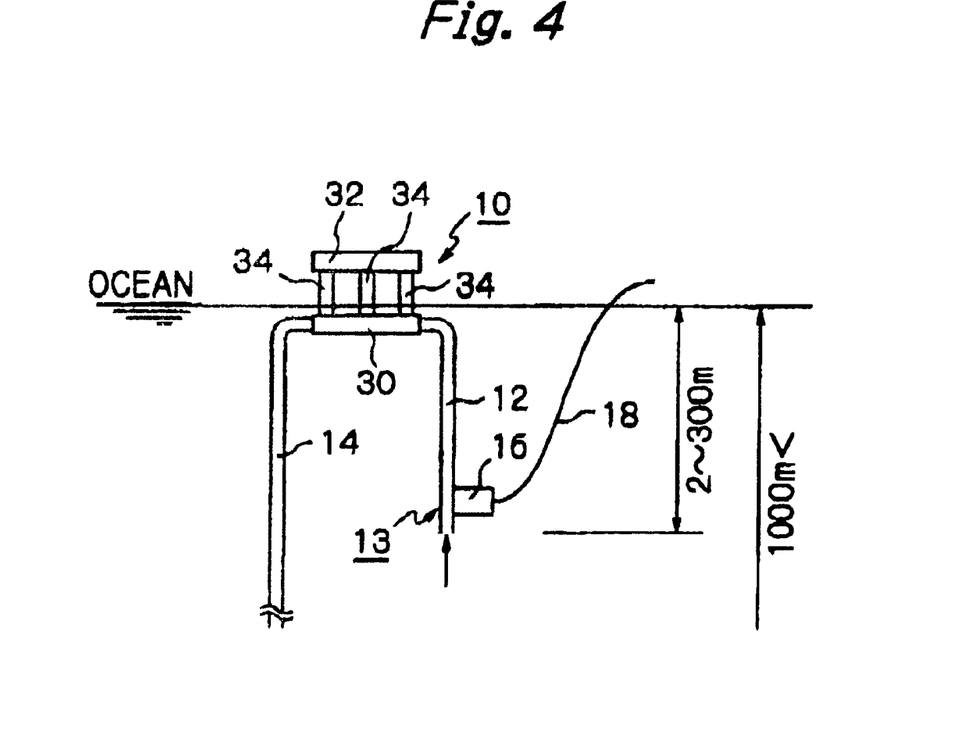
FIG. 4 and FIG. 5 are schematic explanatory views of some variations of an apparatus of the present invention.
Figure 5:
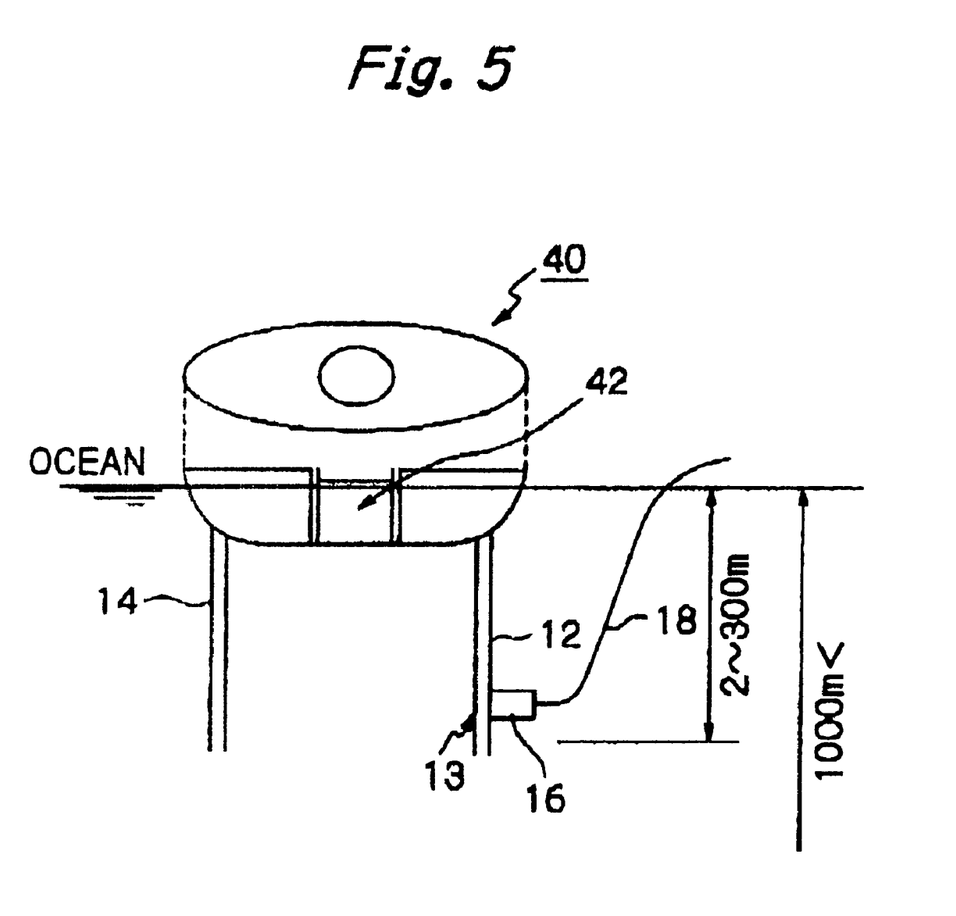

FIGS. 3–5 show the case in which the vessel 10 is installed at the surface of the sea or in the vicinity thereof In the example shown in FIG. 3, the vessel 10 is installed at the surface of the sea, the pipe 12 forming a short leg is equipped with a gas blowing apparatus 16 at the lower end portion 13 thereof, and waste gas containing carbon dioxide which is sent through a gas supply line 18 is blown into the pipe. The pipe 14 forming a long leg is used with its lower end portion (not shown) opening onto deep in the sea.

The structure of the vessel 10 may be such that it is provided with a space which is simply connected to the pipe forming a short leg and the pipe forming a long leg. In the illustrated example, the upper end portion of the vessel 10 is open to the atmosphere, but it may also be formed as a closed space with a lid or the like, in which case it is provided with a discharge valve or a discharge pipe for undissolved gas in a suitable location.

In FIG. 3, as in the case of FIG. 2, in the pipe 12 forming a short leg, the cross-sectional area of the upper end side, i.e., upper end side 28, may be made larger than that of the lower end side, i.e., lower end side 26.

FIG. 4 shows a variation in which a semi-submersible structure is used as a vessel 10 installed at the water surface.

Here, the semi-submersible structure is one in which the vessel 10 is formed by a vessel body 30 and an upper structure 32, with the vessel body referring to a structure of a form which is submerged in sea water. In the illustrated example, the vessel body 30 and the upper structure are connected by pipes 34, and the upper structure is open to the atmosphere.

By using such a semi-submersible structure, the effects of waves are decreased, and it is possible to stably operate the apparatus.

FIG. 5 shows an embodiment in which a ship-type structure 40 is used as a vessel installed at the water surface.

Here, a ship-type structure refers to a structure having a body which floats on the sea, i.e., a hull structure. It differs from the vessel of FIG. 1 in that the vessel itself becomes a hull and can freely float.

In the illustrated example, a turret 42 which has a structure so that it is not influenced by the direction of the hull is provided at the center of the ship-type structure 40. A pipe 12 forming a short leg and a pipe 14 forming a long leg are installed on such a ship-type structure. The upper portion of the ship-type structure 40 is open to the atmosphere.

By using such a ship-type structure, it becomes unnecessary to provide a buoyant body for supporting the pipes forming a long and a short leg, and it also becomes unnecessary to provide gas discharge piping. In particular, in the case of a ship-type structure, by making the center portion a turret structure, even if the hull is influenced by sea currents, it can automatically move by rotation or the like to a direction in which the effects are minimized.

Figure 6:
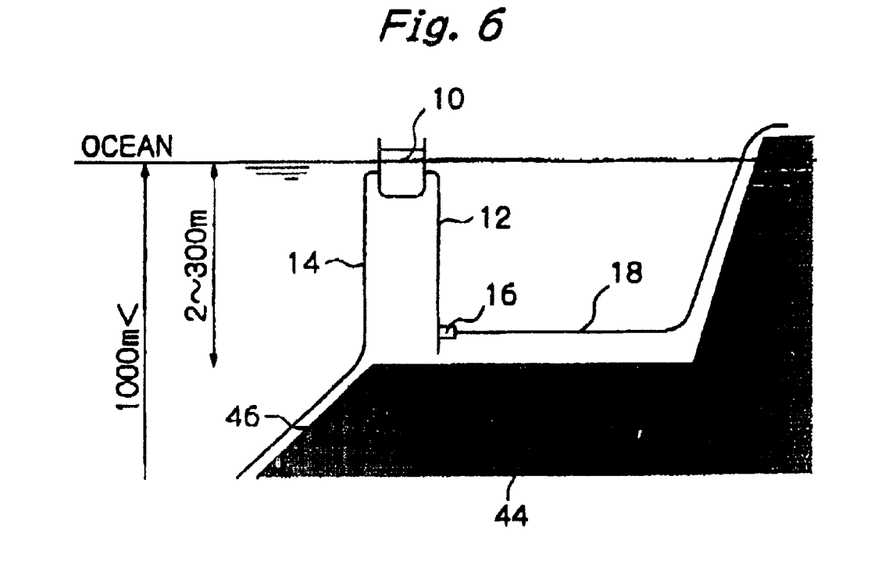
FIG. 6 is a schematic explanatory view showing the case in which an apparatus according to the present invention is installed in a relatively shallow location such as the border of the continental shelf and the continental slope.

FIG. 6 shows an embodiment of an apparatus according to the present invention in which the installation location of a vessel 10 used in the present invention is at the border of the continental shelf 44 and the continental slope 46. The pipe forming a long leg can be installed along the sea floor, so installation and mooring of the vessel 10 in the sea become simple.

Figure 7:
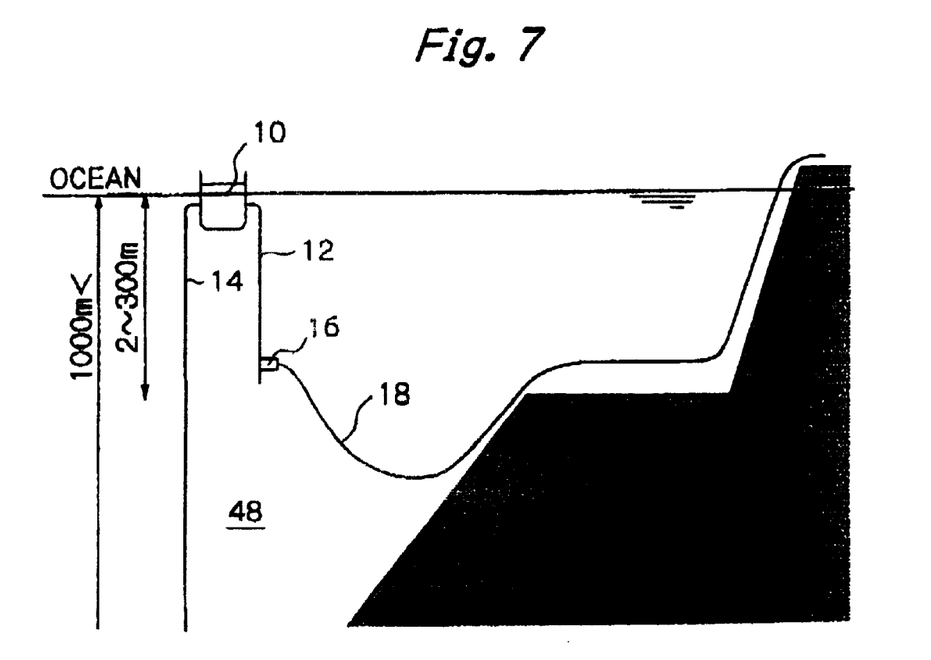
FIG. 7 is a schematic explanatory view showing the case in which an apparatus according to the present invention is installed off shore in deep water.

FIG. 7 is an embodiment in which the vessel 10 is installed in an offshore location 48 in deep water. In this case, by decreasing the pressure losses in the sinking pipe, sinking of sea water within the vessel to deep in the sea due to the gas lift effect becomes easy.

FIGS. 8–11 show an example of an integral structure in which a vessel 10 and a pipe 12 forming a short leg and a portion of a pipe 14 forming a long leg are housed in a cylindrical structure.

Figure 8:
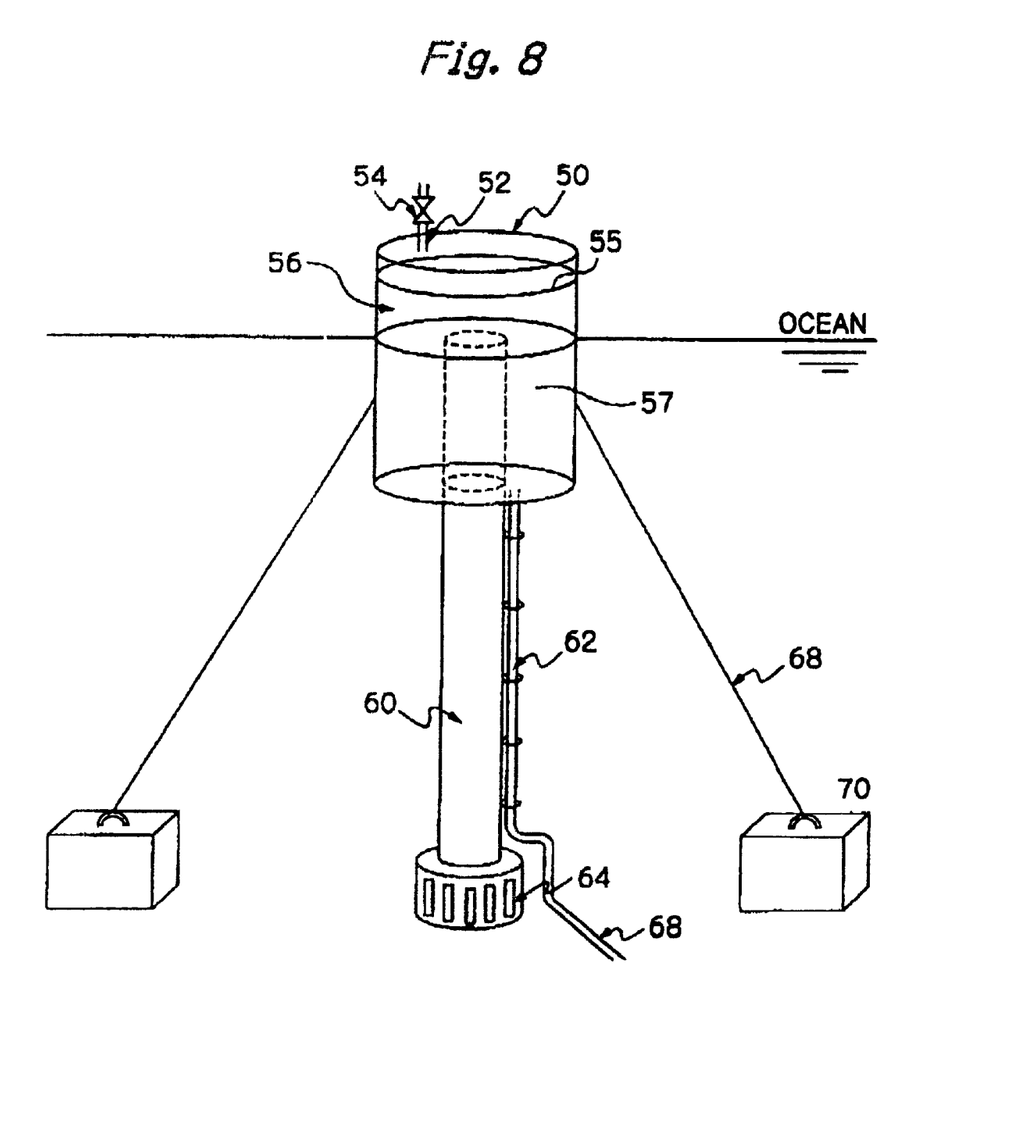
FIG. 8 is a schematic view showing the overall structure of another mode of an apparatus according to the present invention.

As shown in the mode of FIG. 8, a vessel, a buoyant body, a ballast tank, a dissolving pipe for producing a gas lift effect and a portion of a dissolving pipe like those described above are constituted by a vertically elongated cylindrical structure 50 which is installed at the surface of the sea.

FIG. 9(a) is a longitudinal cross-sectional view of the cylindrical structure 50 according to the invention shown in FIG. 8, and FIG. 9(b) is a transverse cross-sectional view taken along line A—A. In this example, a plurality of small diameter vertical pipes 74 are provided in the periphery of a large diameter vertical pipe 72 concentrically provided on the interior of the cylindrical structure 50. The cylindrical structure 50 floats on the sea. Reference number 75 indicates a tank into which ballast water for adjusting buoyancy is poured.

As can be seen from the illustrated example, the upper portion of the cylindrical structure 50 is made a vessel 56 on which are installed a discharge pipe 52 and a valve 54 for discharging gas within its interior to the atmosphere, while in its lower portion 57 are housed ballast tanks 75 which function as buoyant bodies for adjusting flotation and a portion 72 of a large diameter sinking pipe 60 and small diameter dissolving pipes 74.

Waste gas containing water-soluble gas is sent by an sea floor pipeline 68 to the sea floor immediately below the cylindrical body 50, and it is blown into the dissolving pipes 74 through a pipeline riser 62 which rises along the sinking pipe 60.

The upper ends of the dissolving pipes 74 are connected to the vessel 56 in the upper portion of the cylindrical structure, the lower ends open into the sea, waste gas containing water-soluble gas is blown in through blowing nozzles (not shown) installed near the lower ends, and due to the gas lift effect within the dissolving pipes 74, sea water is made to flow in from the lower ends of the dissolving pipes 74, and water-soluble gas contained within the waste gas is dissolved in sea water while rising within the dissolving pipes 74.

The vessel 56 acts as a separator for undissolved gas by separating and collecting undissolved gas which did not dissolve in sea water in the dissolving pipes and discharging it into the atmosphere through the discharge pipe 52 and the valve 54. In addition, it conserves the energy possessed by the flow within the dissolving pipes as potential energy due to the rise in the water level 55 and in the pressure of undissolved gas.

The large diameter vertical pipes 72 and 60 fixation as sinking pipes. The upper ends thereof open onto the inside of the vessel 56 in the upper portion of the structure, and the lower ends extend below the lower end of the cylindrical structure 50 and open into deep in the sea. As a result of the increase in density caused by dissolving of water-soluble gas and the potential energy of the sea water within the vessel and the energy stored in the form of pressure of the undissolved gas, the sea water within the vessel 56 in which the water-soluble gas is dissolved sinks to deep in the sea. The sea water which flows downwards in sinking pipe 60 is discharged into the sea from a nozzle provided in block 64.

The apparatus comprising the cylindrical structure 50 and the sinking pipe 60 are secured in a prescribed position in the sea by anchors 70 through mooring lines 68.

By using fiber ropes, for example, as the mooring lines, the ease of handling of the mooring lines is increased, and the process of sinking and installing becomes easier.

If wire rope, chains, or a combination thereof is used as the mooring lines, the load which can be applied to each mooring line can be increased, so the number of mooring lines which are necessary can be decreased compared to the case in which fiber rope is used.

Namely, when using the structure shown in FIG. 8, the dissolving pipes, a portion of the sinking pipe, and the vessel are integrated within the cylindrical structure, and the cylindrical structure is installed on the surface of the sea, so compared to the conventional technology in which an inverted J-shaped structure is installed in the sea, installation in the sea is clearly, easy and safe.

Figure 9:
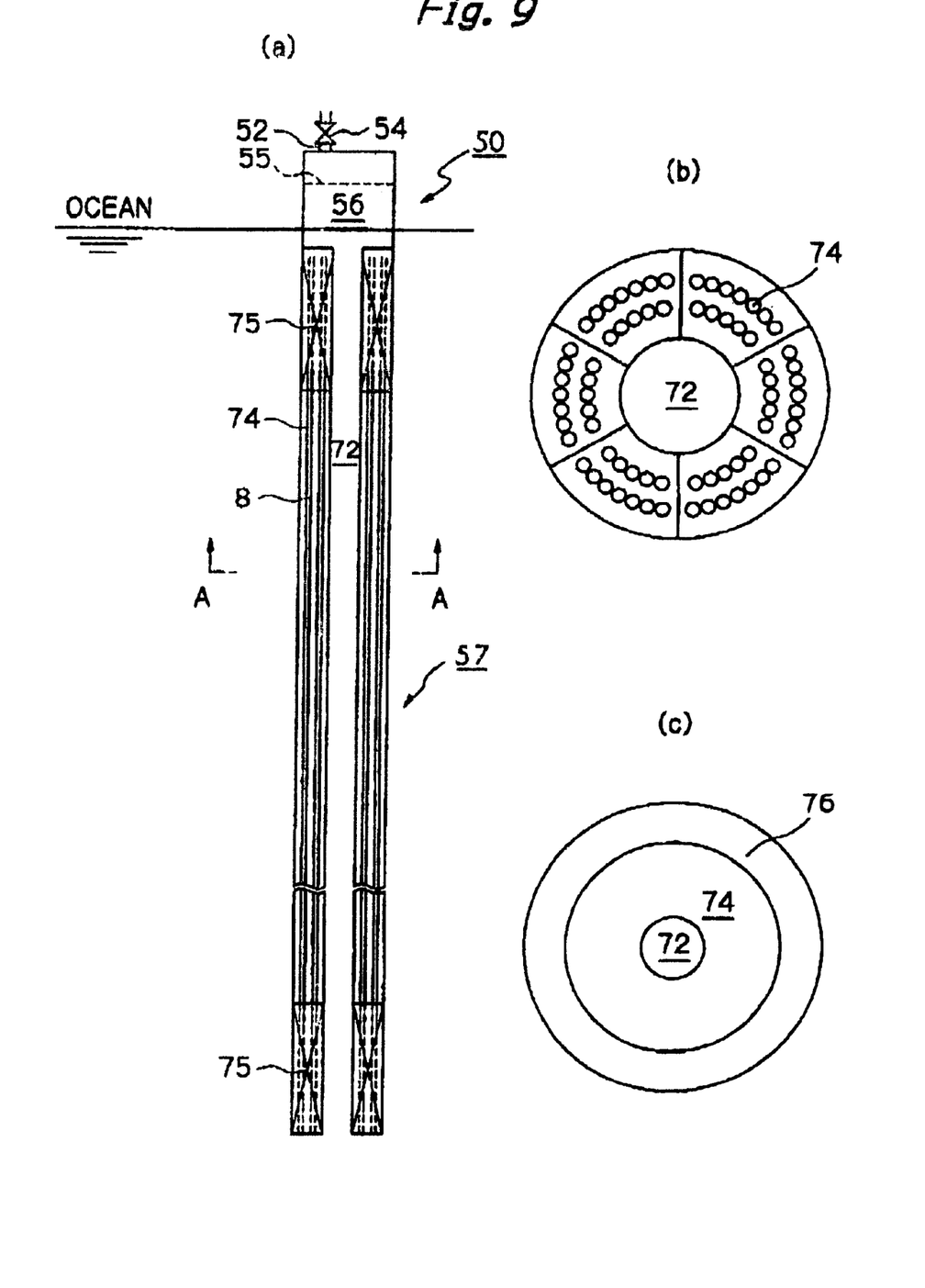
FIG. 9(a), FIG. 9(b), and FIG. 9(c) are respectively a longitudinal cross-sectional view, a transverse cross-sectional view, and a transverse cross-sectional view of the cylindrical structure of FIG. 8.

As shown in the example of FIG. 8 and FIG. 9, by having a single sinking pipe 60, installation of the sinking pipe 60 becomes easy. In addition, by providing the dissolving pipes 74 which provide a gas lift effect within the cylindrical structure 50 surrounding the sinking pipe 72 positioned at the center, the balance of the cylindrical structure 50 on the sea is improved.

Installation of the sinking pipe in the cylindrical structure and extending the sinking pipe to the lower end of the cylindrical structure become easy, permitting a decrease in costs.

Furthermore, as shown in FIG. 9(c), by making the dissolving pipes 74 within the cylindrical structure integral with an annular gas lift-dissolving space, the structure of the interior of the cylindrical structure is simplified, manufacture thereof becomes easy, and costs can be decreased. Furthermore, the cross-sectional area of the dissolving pipe can be increased, and the treatment capacity can be increased. In this case, a buoyant body space 76 can be provided surrounding and concentric with the dissolving pipe 74.

By omitting a cover for the vessel at the upper portion of the cylindrical structure, a valve for controlling the pressure within the vessel and for discharging undissolved gas into the atmosphere can also be omitted, permitting a decrease in costs.

In this case as well, the cross-sectional area of the upper end side of the dissolving pipe may be made larger than the lower end side.

Figure 10:
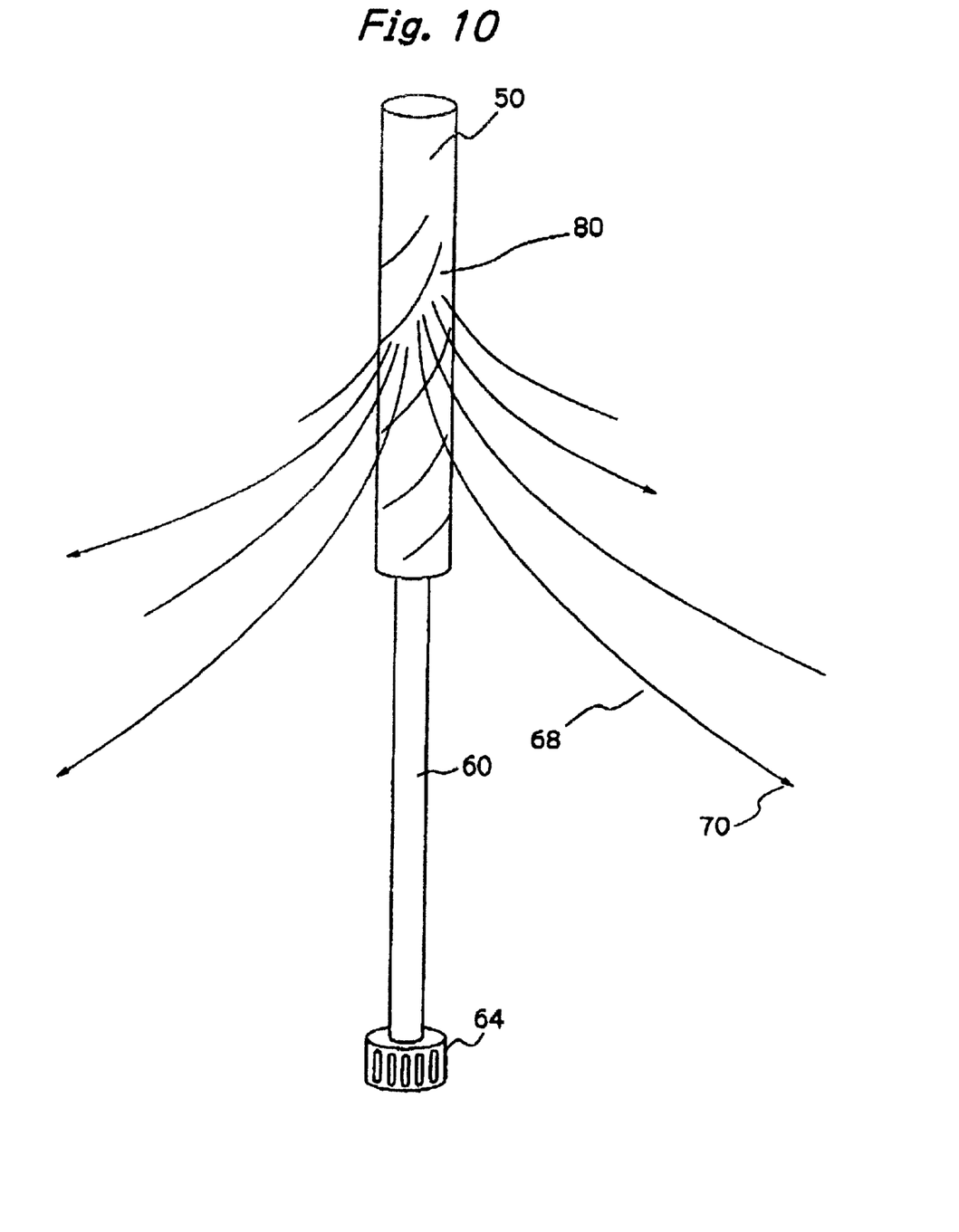
FIG. 10 is a schematic explanatory view showing in an installed state a cylindrical structure having helical fins installed thereon for preventing the formation of vortex-induced vibrations.

FIG. 10 shows the installed state of another mode of a cylindrical structure 50.

Helical fins 80 for preventing vortex-induced vibrations are installed on the outer surface of the cylindrical structure 50.

Figure 11:
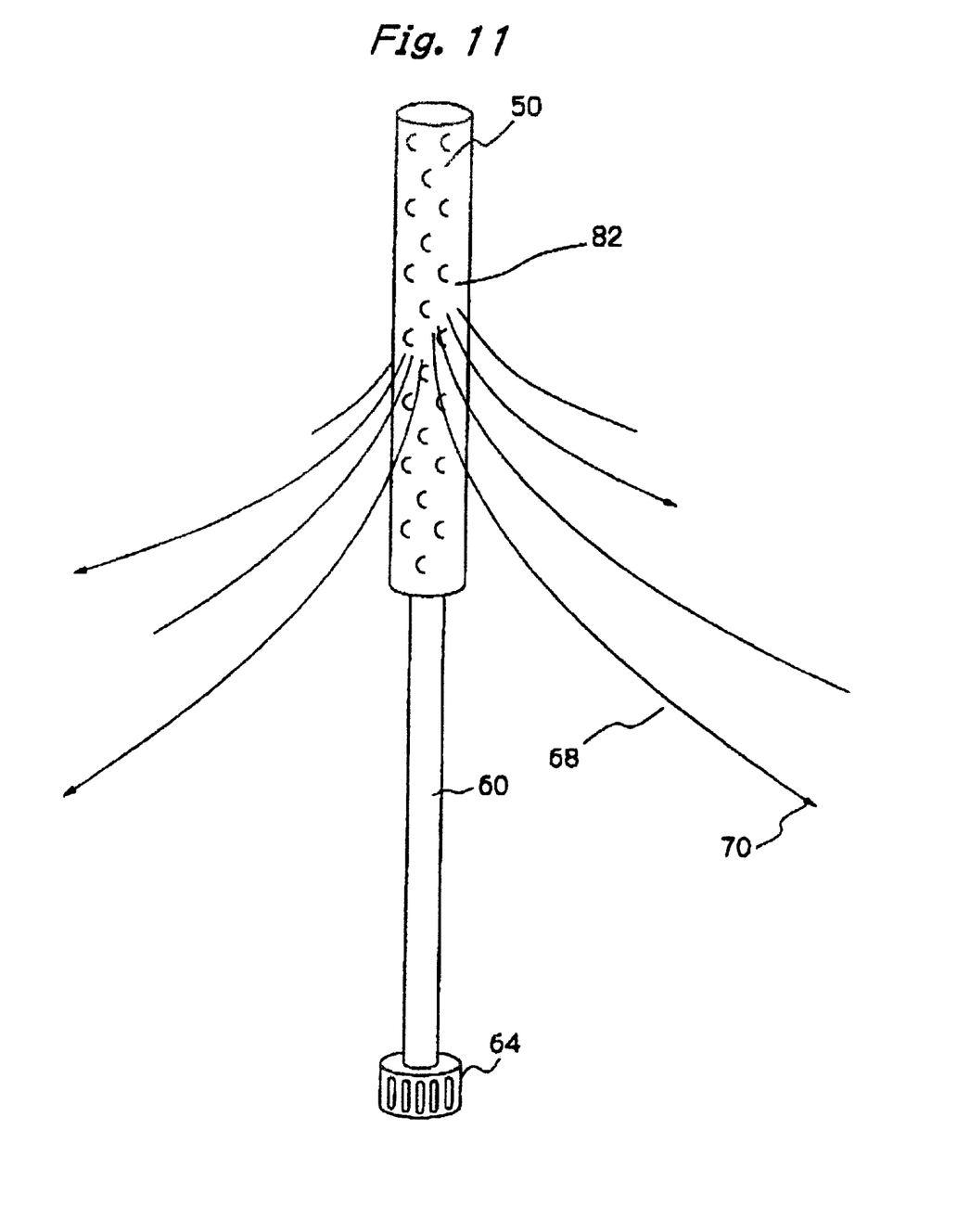
FIG. 11 is a schematic explanatory view showing in an installed state a cylindrical structure having a large number of small protuberances installed thereon for preventing the generation of vortex-induced vibrations.

FIG. 11 shows the installed state of another mode of a cylindrical structure 50.

A large number of small protuberances 82 for preventing vortex-induced vibrations are installed on the outer surface of the cylindrical structure 50.

The fins 80 and the small protuberances 82 reduce the generation of vortex-induced vibrations when sea currents or tidal currents act on the cylindrical structure. Namely, Karman vortices which are generated on the surface of the cylindrical structure when sea currents and tidal currents act thereon are made to collapse by the helical fins 80 or the small protuberances 82 installed on the surface of the structure, so the generation of vortex-induced vibrations is prevented.

FIGS. 12(a)–12(f) schematically illustrate steps in a method of installing an apparatus according to the present invention.

Figure 12:
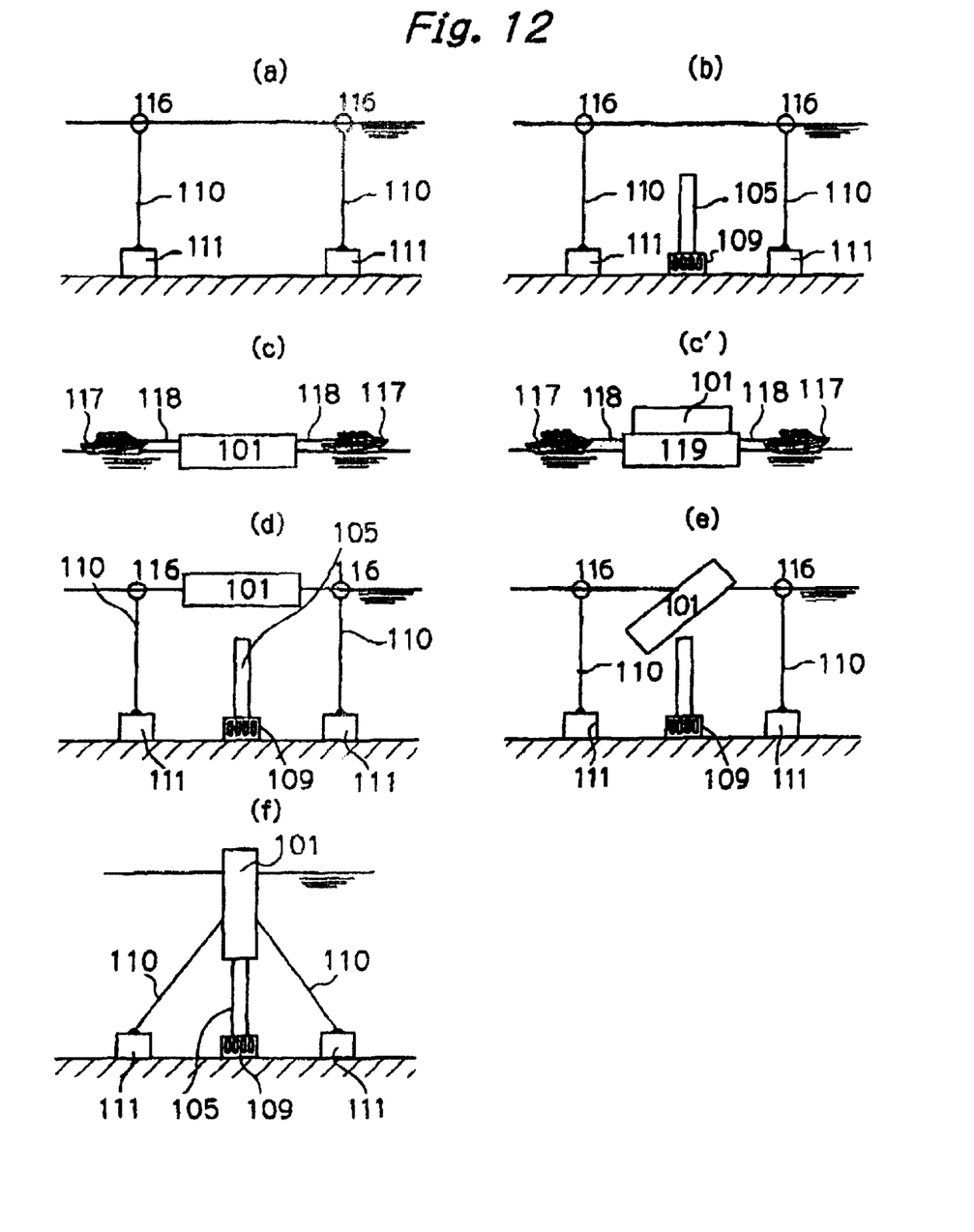
FIGS. 12(a)–12(f) are schematic explanatory views of each step in an installation method for an apparatus according to this invention.

For example, if an apparatus having the structure shown in FIG. 8 is installed in the sea, first, as shown in step (a), anchors 111 and mooring lines 110 are previously installed in an installation position in the sea. The ends of the mooring lines 110 can be connected to buoys 116 which can serve as landmarks.

Next, in step (b), sinking pipe 105 is secured to the sea floor. Although not shown, the sinking pipe 105 can be manufactured in advance at a dock or the like and towed and then sunk to the sea floor.

In the same manner as the above-described sinking pipe, a cylindrical structure 101 in which a dissolving pipe and a vessel and the like are integrated is manufactured and assembled within a compartment such as a shipbuilding dock which can be filled with and drained of water. In this way, manufacture becomes easy, the quality of welding and the like is improved, and as a result, the quality of manufacturing and assembly of the cylindrical structure 101 is improved, and a structure of good quality can be assembled in a short period of time.

In stop (c), the cylindrical structure 101 which is manufactured in this manner is transported to the installation site. If the interior of the compartment of a dock or the like is filled with water and the cylindrical structure 101 is floated like a boat on the surface of the water, it can be towed by floating to the installation site by a tug boat 117 using a line 118.

In the case in which there is a problem with directly floating and towing the cylindrical structure 101, as shown in step (c'), the cylindrical structure 101 can be mounted on a barge 119 and towed.

At the installation site, as shown in step (d), the cylindrical structure 101 is floated to a predetermined installation position, and by filling ballast tanks for adjusting buoyancy with water, it is made to stand upright (upended). See step (e).

As shown in step (f), after the cylindrical structure 101 is erected at the installation position, mooring lines 110 are connected to prescribed mooring points on the cylindrical structure by an underwater robot such as an ROV (remotely operated vehicle), a work boat such as one equipped with a crane, divers, or the like.

In this manner, in the steps shown in FIGS. 12(a)–12(f), installation of the cylindrical structure at the installation site can be performed at a single time, and by installing the anchors, the mooring lines, and the body of the sinking pipe prior to installing the cylindrical structure, onsite work after erecting the cylindrical structure becomes only welding operations, so the number of construction days on site is decreased, and costs can be decreased.

Extending the sinking pipe to below the lower end of the cylindrical structure, i.e., extending it to the sinking pipe body can be performed after installation of the cylindrical structure using an underwater robot such as an ROV, a work boat such as a boat equipped with a crane, divers, or the like, or as described above, just the sinking pipe body can be installed prior to installing the cylindrical structure, and after the cylindrical structure is erected at the installation position, it can be connected to the lower end of the cylindrical structure by an underwater robot such as an ROV, a work boat with a crane, divers, or the like.

The materials and structure of the sinking pipe below the lower end of the cylindrical body must be such as to absorb movement of the cylindrical body on the sea due to the action of sea currents and tidal currents and waves.

Possibility of Industrial Use

According to this invention, a method and apparatus for dissolving carbon dioxide gas, which is a global warming gas, in sea water and isolating it deep in the sea can be provided which is more practical and more efficient than dissolving and isolation methods for gaseous carbon dioxide according to conventional technology.

The present invention makes the separation and discharge of undissolved gas within blown gas easy, so it is possible to dissolve water-soluble gas (carbon dioxide gas and the like) from waste gas discharged in large quantities from stationary gas generating facilities such as thermal power plants in the sea isolate it deep in the sea without separating and recovering it. As a result, it is possible to reduce the energy and costs necessary for separation and recovery of water-soluble gas.

In the present invention, by performing easy separation and discharge of undissolved gas in gas being blown, which is a major technical problem of the prior art, water-soluble gas (carbon dioxide and the like) from waste gas discharged in large quantities from stationary gas generating facilities such as thermal power plants can be dissolved in sea water and isolated deep in the sea without performing high purity separation and recovery. As a result, the energy necessary for high purity separation and recovery of water-soluble gas is reduced, and large decreases in costs are therefore possible.

In addition, in the present invention, by integrating a dissolving pipe, a separating vessel for undissolved gas, and a sinking pipe with each other and manufacturing a cylindrical structure as an integrated body at a shipyard dock or the like, it is possible to decrease operations in the field, to increase quality, and decrease costs. Furthermore, it is made a practical apparatus by having an overall structure which is installed on the sea rather than in the sea.

What is claimed is:

1. An apparatus for dissolving water-soluble gas in sea water and isolating the gas deep in the sea, characterized in that the apparatus is equipped with an elongated cylindrical structure which is installed at the surface of the sea, the cylindrical structure which houses a small diameter first vertical pipe and a large diameter second vertical pipe is concentric with respect to the second vertical pipe, the upper end portions of the first and second vertical pipes are connected through a container section which partitions the interior of the cylindrical structure, the first vertical pipe functions as a dissolving pipe which exhibits a gas lift effect, the second vertical pipe functions as a sinking pipe, the container section functions as a separator for undissolved gas, gas containing water-soluble gas is blown from a blowing nozzle mounted near the lower end of the dissolving pipe which opens into the sea, sea water flows into the lower end of the dissolving pipe due to the gas lift effect of the gas in dissolving pipe, the water-soluble gas contained in the gas is dissolved in sea water as it rises within the dissolving pipe, undissolved gas which did not dissolve in sea water in the dissolving pipe is separated and accumulated in the container section, the energy possessed by the flow within the dissolving pipe is conserved as potential energy in the rise of the water level and as energy stored in the form of pressure of the undissolved gas, and the sea water in the container section in which water-soluble gas is dissolved settles to deep in the sea through the sinking pipe, the lower end of which extends below the lower end of the dissolving pipe and opens onto deep in the sea, due to an increase in density caused by the dissolving of water-soluble gas and an increase in the potential energy of the sea water in the container section and the energy stored in the form of pressure of the undissolved gas.

2. An apparatus as claimed in claim 1 provided with a ballast tank for adjusting buoyancy in the lower portion of the cylindrical structure.

3. An apparatus as claimed in claim 1 wherein a plurality of the small diameter first vertical pipes are provided around the sinking pipe.

4. An apparatus as claimed in claim 1 wherein ah annular space is formed around the sinking pipe and the entire annular space is made a gas lift dissolving space.

5. An apparatus as claimed in claim 4 wherein an upper end side of the gas lift dissolving space has a larger cross-sectional area than a lower end side.

* * * * *